Figure 1:
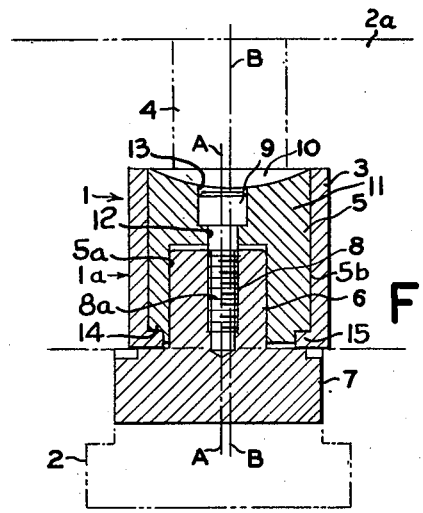

Oct. 8, 1957     W. LONG     2,808,654
LOCATING KEY FOR ALIGNING A TOOL, JIG, OR FIXTURE
WITH THE SLOT OF A MACHINE TABLE
Filed Jan. 31, 1955

INVENTOR.
WALTER LONG
BY
Merrill M. Blackburn.

ATTORNEY

United States Patent Office 2,808,654
Patented Oct. 8, 1957

2,808,654

LOCATING KEY FOR ALIGNING A TOOL, JIG, OR FIXTURE WITH THE SLOT OF A MACHINE TABLE

Walter Long, Davenport, Iowa, assignor to Ace Drill Bushing Co., Inc., Los Angeles, Calif., a corporation of California Application January 31, 1955, Serial No. 485,045

6 Claims. (Cl. 33—181)

The present invention relates to a locating key, and particularly to a locating key for aligning a tool, jig or fixture on a table or plate having a slot in its upper surface to receive a protruding portion of the key.

An object of the present invention is to have a key for such use which will be adjustable, within itself, in order to provide a means for correcting, by infinitesimal amounts, the lateral error of the tool, jig or fixture with the machine table, after the tool, jig or fixture is mounted upon said machine table.

Another object is this invention is to render obsolete the present expensive method of accurately machining a slot in the base of a fixture to receive the keys now in use.

Still another object of this invention is to provide a base of rectangular shape with parallel sides of fixed dimensions so that the key can, when revolved ninety degrees, be adaptable to another machine having a different width of slot, and a stem projecting from the base and carrying an eccentric cylinder which in turn journals a sleeve made to enter a hole of suitable diameter in the body of a fixture or the like and be secured therein by a press fit. This will enable the user to remove the rectangular portion and add others of different sizes to adapt a tool, jig, or fixture to any machine having a locating slot, regardless of the size of said slot.

With my alignment key there are innumerable adjustments possible because the revolvable portion is eccentric to the stem axis and can be turned to give a maximum or a minimum amount of adjustment, depending upon the amount of rotation of the cylinder and any amount between the two.

Figure 2:
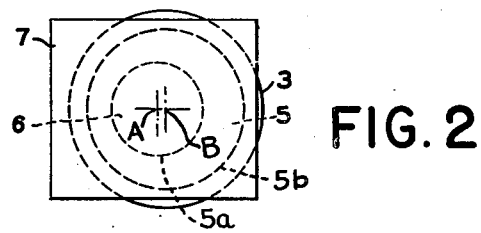

In the drawings annexed hereto and forming a part hereof,

Fig. 1 is a section of the assembled key, the bed of the machine and an associated tool, jig, or fixture being illustrated in dot-dash outline; and Fig. 2 is a bottom view of the key asembly per se.

The numeral 1 designates the locating key in its entirety, 2 represents a conventional T-slot in a machine bed or table and 2a represents any well-known fixture or the like. The key has a base 7, an integral cylindrical stem 6, a rotatable eccentric cylinder 5 and a sleeve or housing 3. The base 7 of the locating key is received in and free to slide lengthwise of the T-slot 2 in the table and the tool, jig or fixture used with the key is also therefore free to move in the same direction, but such tool, etc., is held in position laterally by the housing or sleeve 3 which is pressed into a hole 1a bored into the tool, etc.

A hole 4, coaxial with and here of smaller diameter than the hole 1a, is drilled through the tool, jig, or fixture to allow axial entrance of an adjusting wrench to the recessed, wrench-receiving head 9 of a securing and releasing screw 8 which is threaded into a tapped bore 8a in the stem 6. The hole 1a receives the housing 3 preferably in a press fit so as to prevent relative vertical movement of the fixture 2a and the housing 3 so that the tool, with the key therein may be lifted clear of the table or bed. In the usual tool, jig, or fixture, there are, ordinarily, two or more holes 1a for the reception of as many locating keys. The hole 4 is also large enough to permit the insertion of a screw driver for turning the cylinder 5 which is provided with a diametrical slot or screw driver nick 10.

The revolvable member or cylinder 5 has a cylindrical recess or bore 5a therein which has its axis eccentric to the axis of the outer cylindrical surface 5b of the member and which closely fits the stem 6, for rotation of said member relative to the base 7 as well as relative to the sleeve 3. The common axis of the stem 6 and recess 5a is indicated by the line A—A, and the axis of the outer cylindrical surface of the member 5 is indicated by the line B—B. Therefore, when the base and sleeve are held and the member 5 is rotated, it will turn about the axis A—A, and, since that axis is radially offset from the axis B—B, the sleeve or housing is moved bodily from side to side, and the fixture, etc., is therefore adjusted laterally or radially so that some reference point or line on the tool, etc. is located properly relative to the T-slot. When the adjustment is completed, the screw 8 is turned in to hold the member 5 in adjusted position.

Although the screw 8 is threaded into the tapped bore in the stem 6, the screw rotates in the cylindrical member 5, the top end of which affords a radial wall 11 having an aperture 12 for the screw 8; and the head 9 of the screw is recessed in said member wall at 13. Consequently, when the screw 8 is tightened, it moves toward the base 7. The lower end of the member 5 is annularly reduced to afford an annular shoulder 14 and this shoulder seats on an annular radially inwardly directed flange 15 at the bottom of the sleeve 3. Hence, as the screw 8 is tightened, the shoulder 14 clamps the flange 15 against the top face of the base.

Since the housing 3 of each key used is pressed into its respective hole 1a in the fixture, etc., and the fit between each housing and its cylindrical member 5 is such that the member may be rotated when the screw 8 is loosened, the result is that the members may be selectively turned in their housings 3 while the key, table and fixture, etc. are assembled, thus shifting the tool, etc. relative to the bed or table so that either or both ends of the tool, etc. may be moved laterally to compensate for any irregularity in the placing of the tool, jig, or fixture. Since the base of the key is liftable from the table slot, the fixture and assembled key or keys can be bodily removed and replaced without disturbing the adjustment of the keys.

It is of course understood that the specific description of structure set forth above may be deviated from without departing from the spirit of this invention as disclosed in this specification and as defined by the appended claims.

Having now described my invention, I claim:

1. An adjustable locating key of the character described, comprising: a generally horizontal base slidable lengthwise of and liftable from a slot in a table or the like; a cylindrical upright stem fixed to the base to rise above such table and having a free top end and an axial tapped bore opening at said end; means on the base engageable with a side of the slot to hold said base and cylindrical stem against rotation in the slot; an adjusting member having top and bottom ends, an outer cylindrical surface, and a cylindrical recess at its bottom end journaling said member on the stem, the axes of said surface and recess being eccentric and the top end of said member affording a radial wall abutting the top end of the stem and closing said recess from the top except for an aperture in said wall in axial register with the tapped bore in the stem, said top end further having upwardly facing tool-receiving means whereby said member may be rotated relative to the base and stem; a sleeve having an external portion receivable in an opening in a fixture or the like above the table and further having a cylindrical bore fitting the cylindrical outer surface of the member to enable rotation of the member relative to the sleeve so that rotation of said member while the sleeve and base are held against rotation results in radial displacement of the sleeve and fixture relative to the base and table, said sleeve having an open upper end affording access to the tool-receiving means and to the aperture; means interengageable between the sleeve and member for preventing axial separation of the two; and a threaded fastener passed through said aperture and threaded into the tapped bore for securing the member against rotation relative to the base and stem, said fastener having a head engaging the radial wall at the top end of the member and said head having tool-receiving means thereon accesible through the open top of the sleeve.

2. The invention defined in claim 1, in which: the means interengageable between the sleeve and adjusting member comprises an annular reduced shoulder at the bottom end of the member; and an annular, radially inwardly directed flange at the bottom end of the sleeve and engaging said shoulder.

3. The invention defined in claim 2, in which: the base has an upper face portion extending radially outwardly from the stem and beneath said flange, and the bottom of said shoulder is spaced axially above the base face with said flange between said face and said bottom of the shoulder whereby said flange is axially clamped between said face and the member shoulder when the fastener is tightened and is released when the fastener is loosened.

4. The invention defined in claim 1, in which: the sleeve has a top end generally at the level of the top end of the member; and said top end of the member is recessed to accommodate the head of the fastener so that said head is generally at the level of the top ends of the member and sleeve.

5. The invention defined in claim 1, in which: the base is in the form of a rectangle in plan and the axis of the stem is at the intersection of the diagonals of the rectangle, the rectangular shape of the base constituting the aforesaid means for holding the base and cylindrical stem against rotation in the slot.

6. An adjustable locating key of the character described, comprising: a generally horizontal base slidable lengthwise of and liftable from a slot in a table or the like; a cylindrical upright stem fixed to the base to rise above such table and having a free top end and a fastener-receiving means at said end; means on the base engageable with a side of the slot to hold said base and cylindrical stem against rotation in the slot; an adjusting member having top and bottom ends, an outer cylindrical surface, and a cylindrical recess at its bottom end journaling said member on the stem, the axes of said surface and recess being eccentric and the top end of said member affording a radial wall abutting the top end of the stem and closing said recess from the top except for a fastener-receiving means in said wall in axial register with the fastener-receiving means in the stem, said top end further having upwardly facing tool-receiving means whereby said member may be rotated relative to the base and stem; a sleeve having an external portion receivable in an opening in a fixture or the like above the table and further having a cylindrical bore fitting the cylindrical outer surface of the member to enable rotation of the member relative to the sleeve so that rotation of said member while the sleeve and base are held against rotation results in radial displacement of the sleeve and fixture relative to the base and table, said sleeve having an open upper end affording access to the tool-receiving means and to the aperture; means interengageable between the sleeve and member for preventing axial separation of the two; and a fastener interconnecting the two aforesaid fastener-receiving means for securing the member against rotation relative to the base and stem, said fastener having tool-receiving means thereon accessible through the open top of the sleeve.

References Cited in the file of this patent

UNITED STATES PATENTS

| | | |
|---|---|---|
| 2,216,208 | Michon | Oct. 1, 1940 |
| 2,620,704 | Evans | Dec. 9, 1952 |